(12) United States Patent
Watanabe et al.

(10) Patent No.: US 8,982,557 B2
(45) Date of Patent: Mar. 17, 2015

(54) ELECTRONIC APPARATUS

(75) Inventors: Hideki Watanabe, Ome (JP); Shigeo Hayashi, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 238 days.

(21) Appl. No.: 13/492,629

(22) Filed: Jun. 8, 2012

(65) Prior Publication Data

US 2012/0243179 A1 Sep. 27, 2012

Related U.S. Application Data

(63) Continuation of application No. 12/953,966, filed on Nov. 24, 2010, now Pat. No. 8,218,312.

(30) Foreign Application Priority Data

Apr. 9, 2010 (JP) ................................. 2010-090894

(51) Int. Cl.
*H05K 7/20* (2006.01)
*G06F 1/20* (2006.01)

(52) U.S. Cl.
CPC ...................................... *G06F 1/203* (2013.01)
USPC ................. 361/698; 361/679.47; 361/679.48; 361/679.52; 361/679.55; 361/695; 361/697; 361/701; 361/714; 165/80.2; 165/80.3; 165/104.21; 165/104.33; 165/185

(58) Field of Classification Search
USPC ............. 361/679.46, 679.47, 679.48, 679.52, 361/679.55, 690–697, 700–719; 165/80.2, 165/80.3, 80.4, 80.5, 104.19–104.26, 165/104.33, 104.34, 185; 174/15.1, 16.3; 257/715–724; 454/184
See application file for complete search history.

(56) References Cited

U.S. PATENT DOCUMENTS

| | | | |
|---|---|---|---|
| 6,169,660 B1 * | 1/2001 | Sarraf et al. | 361/717 |
| 6,421,239 B1 | 7/2002 | Huang | |
| 6,535,363 B1 * | 3/2003 | Hosomi et al. | 360/324.1 |
| 6,535,386 B2 | 3/2003 | Sathe et al. | |
| 7,312,997 B2 | 12/2007 | Huang et al. | |
| 7,325,590 B2 * | 2/2008 | Kim et al. | 165/104.33 |
| 7,405,937 B1 * | 7/2008 | Wang et al. | 361/700 |

(Continued)

FOREIGN PATENT DOCUMENTS

| | | |
|---|---|---|
| JP | 06-195154 | 7/1994 |
| JP | 06-291481 | 10/1994 |

(Continued)

OTHER PUBLICATIONS

Notice of Reasons for Rejection mailed by the Japan Patent Office on Feb. 15, 2011 in corresponding Japanese patent app. No. 2010-090894 in 10 pages.

(Continued)

*Primary Examiner* — Michail V Datskovskiy
(74) *Attorney, Agent, or Firm* — Knobbe Martens Olson & Bear LLP

(57) ABSTRACT

According to one embodiment, an electronic apparatus includes a printed circuit board, a heat pipe, a fan unit and a fixing unit. The heat pipe has a first end physically fixed to and thermally connected to a first circuit component, and a second end opposite to the first end. The fan unit is provided in the vicinity of the second end of the heat pipe, and cools the second end. The fixing unit fixes the position of the heat pipe at a position different from the position of the first circuit component.

16 Claims, 7 Drawing Sheets

(56) References Cited

U.S. PATENT DOCUMENTS

| | | |
|---|---|---|
| 7,466,548 B2 | 12/2008 | Ishikawa |
| 7,535,712 B2 | 5/2009 | Tanaka |
| 7,537,049 B2 | 5/2009 | Cheng et al. |
| 7,619,890 B2 | 11/2009 | Tseng et al. |
| 7,639,503 B2 | 12/2009 | Tanaka |
| 7,672,123 B2 | 3/2010 | Tatsukami |
| 7,688,587 B2 | 3/2010 | Ishikawa |
| 7,740,054 B2 | 6/2010 | Yang |
| 7,885,075 B2 | 2/2011 | Li et al. |
| 7,965,512 B2 * | 6/2011 | Huang et al. ............ 361/700 |
| 8,050,033 B2 | 11/2011 | Ishikawa |
| 8,050,038 B2 | 11/2011 | Chen et al. |
| 2006/0077637 A1 | 4/2006 | Ishikawa |
| 2007/0279868 A1* | 12/2007 | Tanaka ............ 361/702 |
| 2008/0191341 A1 | 8/2008 | Nishiyama |
| 2008/0239667 A1* | 10/2008 | Tanaka ............ 361/695 |
| 2009/0046426 A1 | 2/2009 | Ishikawa |
| 2009/0103262 A1* | 4/2009 | Hata ............ 361/689 |
| 2010/0002388 A1 | 1/2010 | Tanaka |
| 2010/0172096 A1 | 7/2010 | Ishikawa |

FOREIGN PATENT DOCUMENTS

| | | |
|---|---|---|
| JP | 07-66577 | 3/1995 |
| JP | 2001-057490 | 2/2001 |
| JP | 2003-218570 | 7/2003 |
| JP | 2006-108166 | 4/2006 |
| JP | 2007-323160 | 12/2007 |
| JP | 2007-324339 | 12/2007 |
| JP | 2008-198864 | 8/2008 |
| JP | 2008-251687 | 10/2008 |
| JP | 2010-33103 | 2/2010 |
| JP | 2010-072904 | 4/2010 |

OTHER PUBLICATIONS

Notice of Reasons for Rejection mailed by the Japan Patent Office on Jul. 19, 2011 in corresponding Japanese patent app. No. 2010-090894 in 5 pages.

Office Action for Japanese patent application 2012-001206 Mailed Apr. 3, 2012.

Office Action received in Japanese Patent Application No. 2012-260144, mailed on Sep. 3, 2013; in 5 pages.

Office Action dated Jul. 22, 2014 in Japanese Patent Application No. 2012-0260144.

* cited by examiner

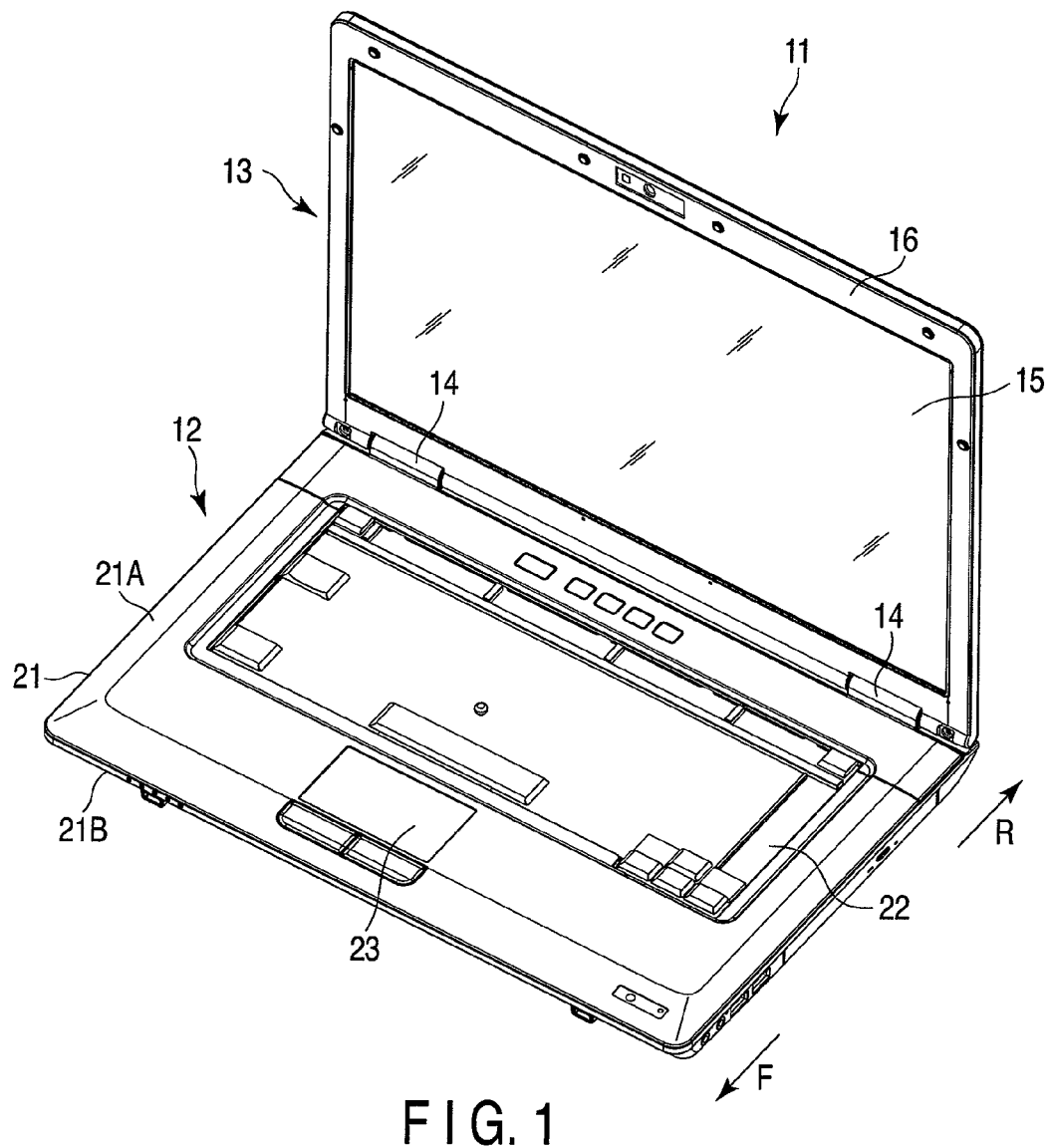
F I G. 1

ELECTRONIC APPARATUS

CROSS-REFERENCE TO RELATED APPLICATIONS

This application is a continuation of U.S. patent application Ser. No. 12/953,966, filed on Nov. 24, 2010, which is based upon and claims the benefit of priority from Japanese Patent Application No. 2010-090894, filed Apr. 9, 2010; the entire contents of which are incorporated herein by reference.

FIELD

Embodiments described herein relate generally to an electronic apparatus comprising a heat pipe.

BACKGROUND

Electronic apparatus in recent years include circuit components of high power, such as a CPU, at high density. Since the circuit components, such as semiconductor devices, are highly integrated and perform information processing at high speed, the circuit components generate a large amount of heat. Therefore, in the electronic apparatus, it is important how to process heat emitted from the circuit components. As a structure for discharging heat generated by the circuit components, a heat pipe is generally used. The heat pipe transfers the heat generated at the circuit components to heat radiating fins provided in the vicinity of a fan. The heat transferred to the heat radiating fins through the heat pipe is discharged to the outside of the apparatus by air blown by the fan.

There is a demand for the above-described heat radiation structure to provide higher stabilization to a holding structure for holding the heat pipe.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 1 is an exemplary perspective view showing a portable computer which is an example of an electronic apparatus according to a first embodiment.

DETAILED DESCRIPTION

Figure 2:
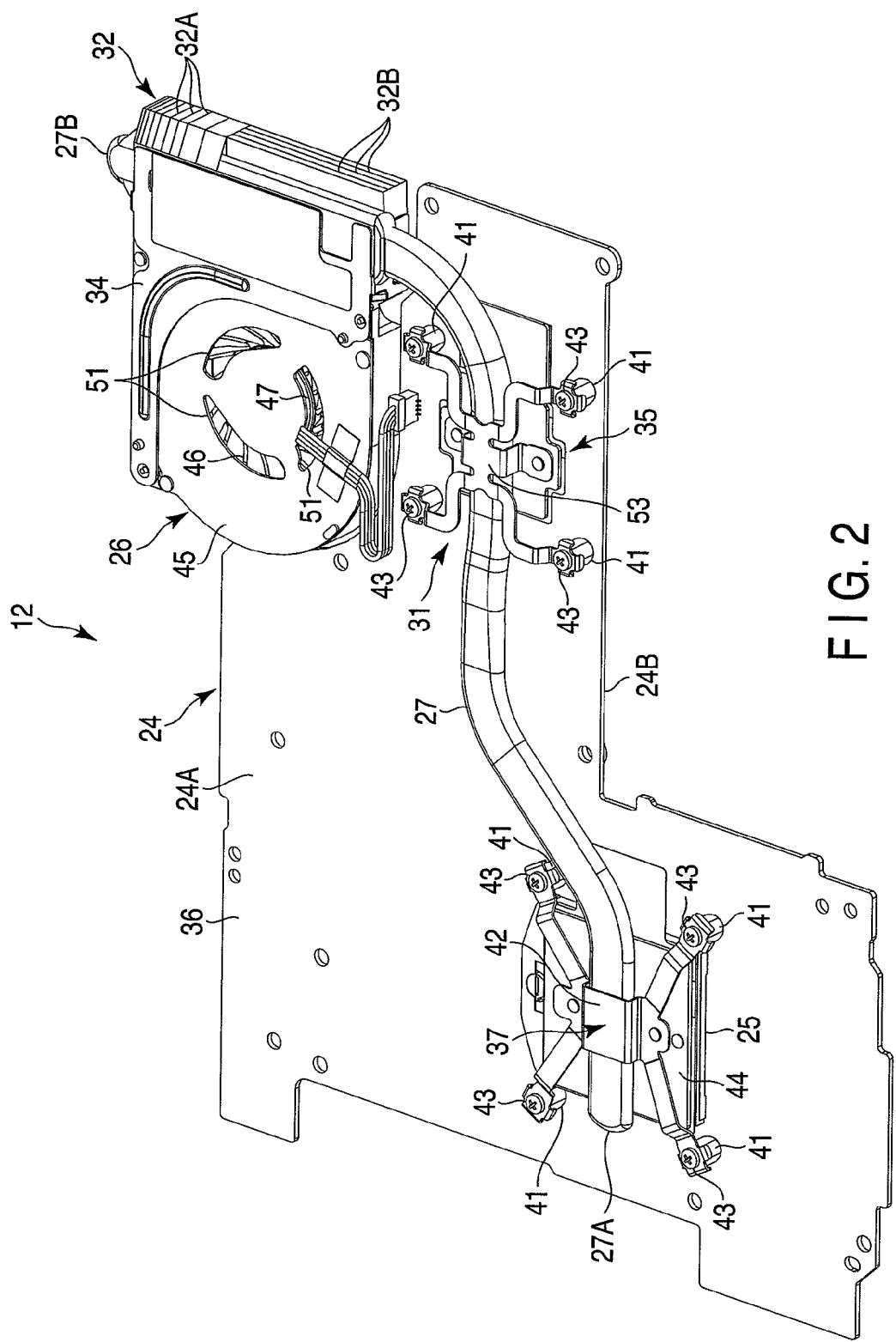
FIG. 2 is an exemplary perspective view showing a printed circuit board, a heat pipe, a fan unit, and a fixing unit contained in a housing of the portable computer shown in FIG. 1.

Various embodiments will be described hereinafter with reference to the accompanying drawings.

In general, according to one embodiment, referring to FIGS. 1-6, a first embodiment of an electronic apparatus will be described. In this specification, the near side to the user (that is, user side) is defined as front F, the far side from the user is rear R, the left-hand side of the user is left, the right-hand side of the user is right, the upper side from the user's position is up and the lower side from the user's position is down.

As shown in FIG. 1, a portable computer 11, which is an example of the electronic apparatus, comprises a main unit 12, a display unit 13, and a hinge 14 provided between the main unit 12 and the display unit 13. The hinge 14 rotatably supports the display unit 13.

The display unit 13 comprises a display 15 and a plastic display case 16 surrounding a periphery of the display 15. In the present embodiment, a liquid crystal display is used as the display 15.

Figure 10:
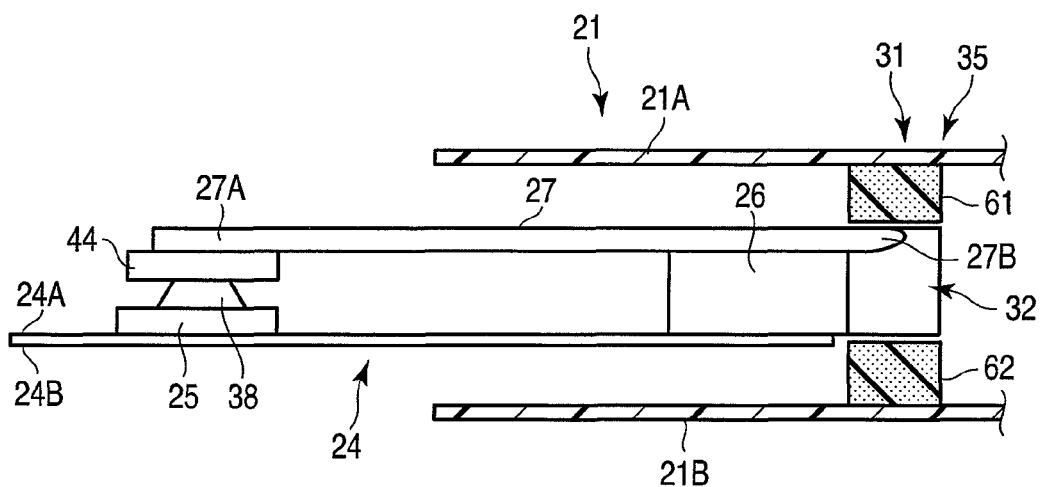
FIG. 10 is an exemplary cross-sectional view schematically showing a printed circuit board, a heat pipe, a fan unit, and a fixing unit of a portable computer which is an example of an electronic apparatus according to a fourth embodiment.

As shown in FIGS. 1 and 2, the main unit 12 comprises, for example, a box-shaped plastic housing 21, a keyboard 22 attached to a top surface of the housing 21, a tough pad 23 provided on the top surface of the housing 21, and a printed circuit board 24 contained in the housing 21. The housing 21 comprises a first case 21A which forms the upper half of the housing 21 and to which the keyboard 22 is fixed, and a second case 21B which forms the lower half of the housing 21. As shown in FIG. 10, the first case 21A is opposed to a first surface 24A of the printed circuit board 24. The second case 21B is opposed to a second surface 24B of the printed circuit board 24.

Figure 3:
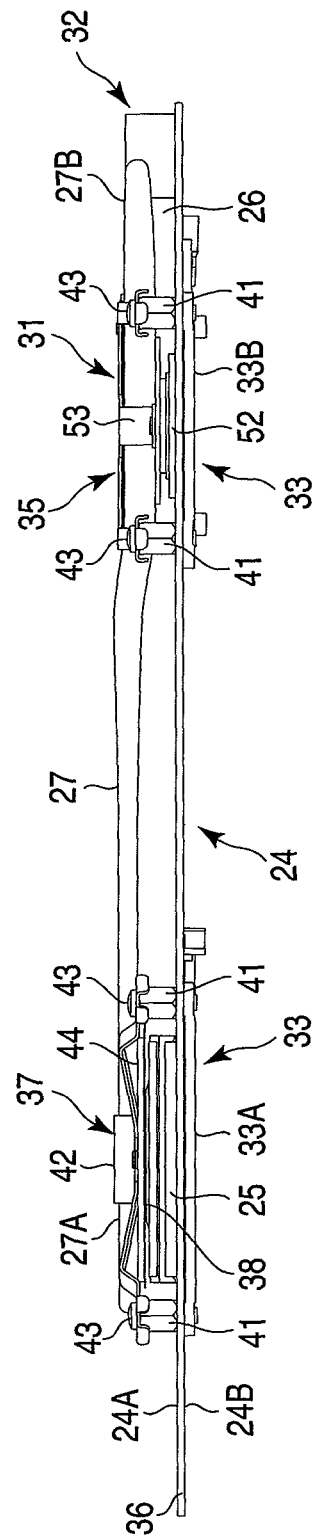
FIG. 3 is an exemplary elevational view of the printed circuit board, heat pipe, fan unit, and fixing unit shown in FIG. 2, which shows an example of the fixing unit according to the first embodiment.

As shown in FIGS. 2 and 3, the main unit 12 further comprises within the housing 21: the printed circuit board 24 including the first surface 24A on which a first circuit component 25 is mounted and the second surface 24B opposite to the first surface 24A; a fan unit 26 for promoting heat radiation of the first circuit component 25; and a heat pipe 27 including a first end 27A connected to the first circuit component 25 and a second end 27B opposite to the first end 27A. Moreover, the main unit 12 comprises within the housing 21: a fixing unit 31 which fixes the heat pipe 27 to the printed circuit board 24; a fin unit 32 fixed to the second end 27B of the heat pipe 27; a reinforcing plate 33 fixed to the second surface 24B of the printed circuit board 24; and a bracket 34 which fixes the fin unit 32 to the fan unit 26.

The reinforcing plate 33 comprises a first portion 33A corresponding to the first circuit component 25 and a second portion 33B corresponding to a position 35 different from the position of the first circuit component 25 as separate parts. Namely, the first portion 33A and second portion 33B of the reinforcing plate 33 are separated in the first embodiment.

The printed circuit board 24 comprises a printed wiring board 36 and the first circuit component 25 mounted on the printed wiring board 36. The first circuit component 25 is formed of an electronic component such as a CPU. On the first surface 24A of the printed circuit board 24, a second circuit component 52 or a spacer 54 mentioned later is attachable at the position 35 different from the position of the first circuit component 25.

The heat pipe 27 is formed by filling a tubular copper heat pipe body with a working fluid which is transitionable between a gas phase and a liquid phase. The working fluid is, for example, pure water, but may be another liquid such as alcohol.

The first end 27A of the heat pipe 27 is physically fixed and thermally connected to the first circuit component 25. More specifically, the first end 27A is pushed to a part of a die 38 of the first circuit component 25 by a holder 37. The holder 37 comprises a plurality of studs 41 provided around the first circuit component 25, a holding plate 42, which is a plate spring, and screws 43 which fix the holding plate 42 to the studs 41. A square heat receiving plate 44 made of a copper material is interposed between the first end 27A of the heat pipe 27 and the die 38 of the first circuit component 25, and thermally connects the first end 27A and the die 38. Between the heat receiving plate 44 and the die 38, thermally-conductive grease or the like may be interposed to increase adherence.

The second end 27B of the heat pipe 27 is located in the vicinity of an outlet (not shown) of the fan unit 26. To the second end 27B, the fin unit 32 is fixed by, for example, brazing (soldering). The fin unit 32 can improve heat radiation performance of the heat pipe 27 at the second end 27B. The fin unit 32 is opposed to and in close contact with the outlet of the fan unit 26. The fin unit 32 integrally comprises a plurality of first fins 32A (longitudinal fins) extending in a direction intersecting (orthogonal to) a direction in which the second end 27B of the heat pipe 27 extends, and a plurality of second fins 32B (lateral fins) extending in a direction along (parallel to) the direction in which the second end 27B extends.

The fan unit 26 is located in the vicinity of the second end 27B to be opposed to the second end 27B of the heat pipe 27. The fan unit 26 comprises a box-shaped fan case 45, a fan body 46 rotatably provided in the fan case 45, and a motor 47 which rotates the fan body 46. The fan case 45 comprises an inlet part 51 and an outlet (not shown). The fan unit 26 blows air to the second end 27B of the heat pipe 27, and cools the second end 27B.

The bracket 34 is made of a stainless material to take an L-shape, and fixes the fin unit 32 to the fan unit 26 to be integral with each other. In other words, the fan unit 26 is fixed to the second end 27B of the heat pipe 27 via the bracket 34 and fin unit 32. Accordingly, in this structure of the present embodiment, a large moment acts on the first end 27A of the heat pipe 27 due to the load of the heat pipe 27 and the loads of the fin unit 32 and fan unit 26, as mentioned later.

The fixing unit 31 fixes the position of the heat pipe 27 at the position 35 different from the position of the first circuit component 25, thereby suppressing displacement of the heat pipe 27 in a thickness direction of the printed circuit board 24. The fixing unit 31 is located closer to the fan unit 26 than the first circuit component 25, and is fixed to the heat pipe 27.

As shown in FIG. 3, in an example of the present embodiment, the fixing unit 31 comprises a second circuit component 52 mounted on the printed circuit board 24, a plurality of studs 41 surrounding a periphery of the second circuit component 52, a connecting member 53 for pushing the heat pipe 27 to the second circuit component 52. The connecting member 53 is a spring plate, and connects the heat pipe 27 to the printed circuit board 24. The second circuit component 52 is, for example, a graphics chip provided for reinforcing an image function of the portable computer 11. The second circuit component 52 is located between the heat pipe 27 and the printed circuit board 24.

Figure 4:
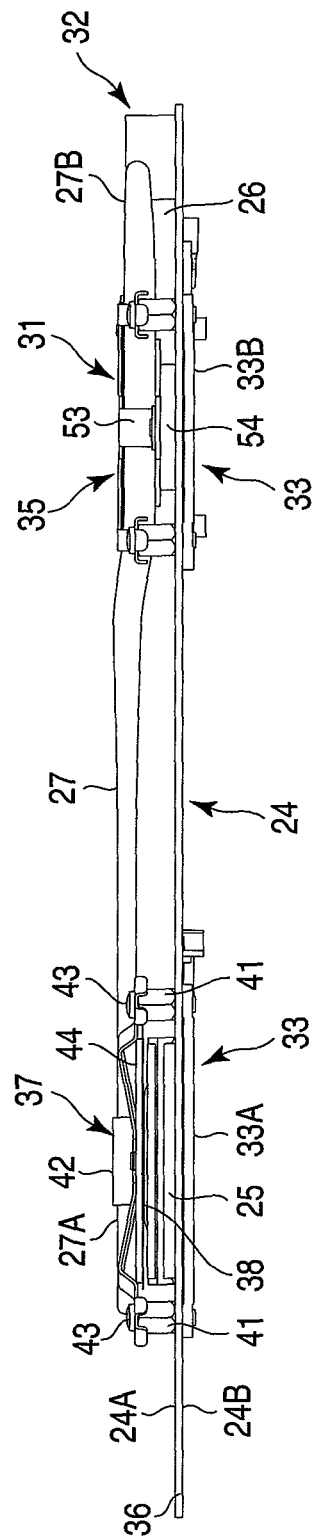
FIG. 4 is an exemplary elevational view of the printed circuit board, heat pipe, fan unit, and fixing unit shown in FIG. 2, which shows another example of the fixing unit according to the first embodiment.

As another example of the present embodiment, the fixing unit 31 may have the structure shown in FIG. 4. Specifically, the fixing unit 31 of this example comprises a spacer 54 mounted on the printed circuit board 24, a plurality of studs 41 surrounding a periphery of the second circuit component 52, and a connecting member 53 for pushing the heat pipe 27 to the second circuit component 52. The spacer 54 is, for example, made of a plastic material to take the same shape as the second circuit component 52, i.e., formed to have the same height as the second circuit component 52, and is located between the heat pipe 27 and the printed circuit board 24. The spacer 54 may be made of a rubber material. Except for the fixing unit 31, the structure shown in FIG. 3 is the same as the structure shown in FIG. 4.

Figure 5:
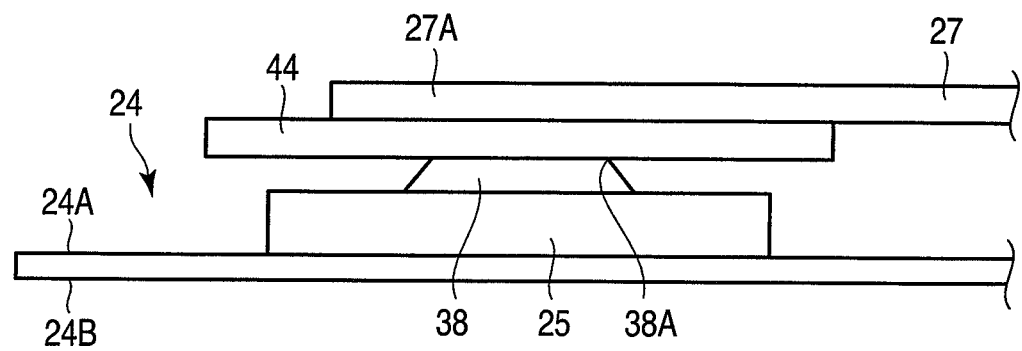
FIG. 5 is an exemplary elevational view schematically showing the printed circuit board, first circuit component and heat pipe.
Figure 6:
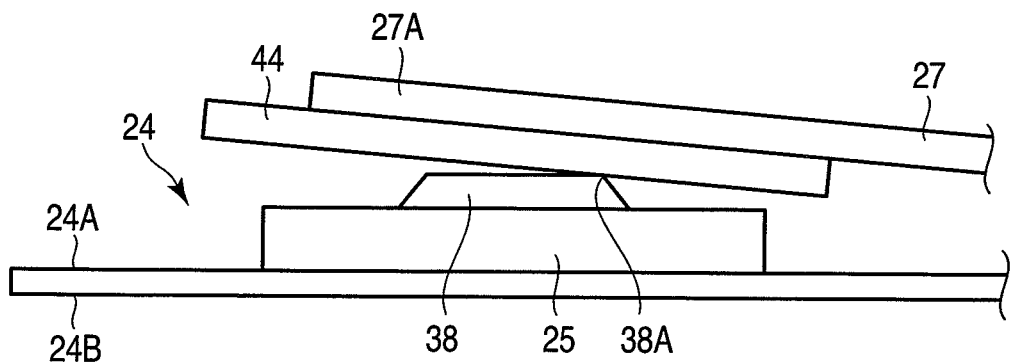
FIG. 6 is an exemplary elevational view showing a state where a moment acts on the heat pipe.

Referring to FIGS. 5 and 6, effectiveness of providing the fixing unit 31 on the printed circuit board 24 as in the present embodiment will be described. FIG. 5 schematically shows a connection structure of the first end 27A of the heat pipe 27 and the heat receiving plate 44 with the die 38 of the first circuit component 25. As mentioned above, for example, when the portable computer 11 is carried by a user, or when the portable computer 11 is subjected to vibration or shock, the loads of the heat pipe 27 itself, fin unit 32 and fan unit 26 are imposed on the first end 27A of the heat pipe 27, and a large moment acts on the first end 27A of the heat pipe 27. As schematically shown in FIG. 6, let us assume that the heat pipe 27 is pushed downward at this moment, for example. An edge 38A of the die 38 is subjected to a great pressure, and in the worst case, the edge 38A of the die 38 may be damaged. However, in the present embodiment, in addition to the part fixing the first end 27A to the first circuit component 25, the fixing unit 31 for fixing the heat pipe 27 to the printed circuit board 24 is provided. Therefore, the load (moment) imposed on the vicinity of the first end 27A of the heat pipe 27 is shared by the vicinity of the fixing unit 31, thereby preventing the die 38 of the first circuit component 25 from being damaged.

According to the first embodiment, the portable computer 11 comprises: the printed circuit board 24 comprising the first surface 24A on which the first circuit component 25 is mounted and the second surface 24B opposite to the first surface 24A; the heat pipe 27 comprising the first end 27A physically fixed and thermally connected to the first circuit component 25 and the second end 27B opposite to the first end 27A; the fan unit 26 which is provided in the vicinity of the second end 27B of the heat pipe 27 and cools the second end 27B; and the fixing unit 31 which is provided on the first surface 24A of the printed circuit board 24, is located closer to the fan unit 26 than the first circuit component 25 and fixed to the heat pipe 27, and suppresses the displacement of the heat pipe 27 in the thickness direction of the printed circuit board 24.

When a circuit component is cooled by means of the heat pipe 27 in the portable computer 11, the heat pipe 27 functions as a lever, and the part fixing the heat pipe 27 to the circuit component tends to be subjected to a load (stress). This phenomenon increases the load on the printed circuit board 24, and when the heat pipe 27 is longer, it is required to more carefully fix the heat pipe 27 to the printed circuit component 24. In the above-described structure, the fixing unit 31 is located closer to the fun unit 26 than the first circuit component 25. Therefore, vibration of the heat pipe 27 can be suppressed even when the portable computer 11 is subjected to shock or vibration. Accordingly, a moment caused by the load of the heat pipe 27 itself does not concentrate on the fixing part in the vicinity of the first end 27A of the heat pipe 27. Consequently, it is possible to effectively prevent, for example, damage to the first circuit component 25 and damage to the printed circuit board 24 caused by the moment which acts on the vicinity of the first end 27A of the heat pipe 27.

In addition, the second circuit component 52 can be mounted at a position from the position of the first circuit component 25 on the first surface 24A of the printed circuit board 24, and the fixing unit 31 comprises: the connecting member 53 connecting the heat pipe 27 to the printed circuit board 24; and one of the second circuit component 52 provided between the heat pipe 27 and the printed circuit board 24 and the spacer 54 provided between the heat pipe 27 and the printed circuit board 24 and having the same height as the second circuit component 52.

A market of portable computer 11 provides a wide variety of models having various functions, such as a model in which a graphics chip is provided to enhance an imaging function and a model only for the use of word processing function, in accordance with use purposes of users. According to the above-described embodiment, if the portable computer 11 has the above-described structure, the fixing unit 31 can be provided at the position 35 different from the position of the first circuit component 25 on the printed circuit board 24 regardless of the presence or absence of the second circuit component 52. Consequently, it is possible to effectively prevent, for example, damage to the first circuit component 25 and printed circuit board 24. This structure is especially effective for a case where a high function model and a low price model having the same appearance are prepared. In addition, a model comprising the second circuit component 52 and a model not comprising the second circuit component 52 can use the heat pipe 27 and the connecting member 53 as common parts, and manufacturing costs can be reduced.

Moreover, the portable computer 11 comprises the bracket 34 for fixing the fan unit 26 to the second end 27B of the heat pipe 27. The bracket 34 integrates the fan unit 26 with the second end 27B, and the load of the fan unit 26 is also imposed on the heat pipe 27. However, in spite of such a structure, the fixing unit 31 can effectively prevent the first circuit component 25 and printed circuit board 24 from being damaged.

Figure 7:
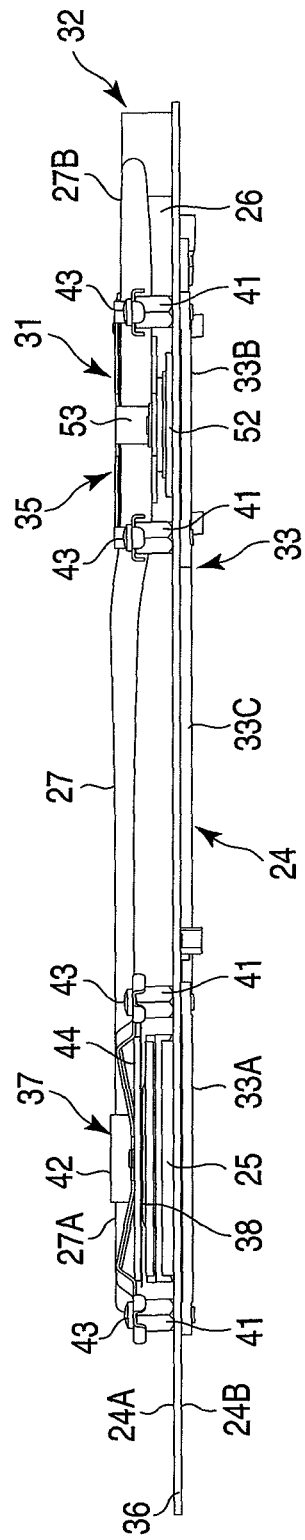
FIG. 7 is an exemplary elevational view showing a printed circuit board, a heat pipe, a fan unit, a fixing unit, and a reinforcing plate of a portable computer which is an example of an electronic apparatus according to a second embodiment.

Referring to FIG. 7, a second embodiment of the electronic apparatus will be described. The portable computer 11 which is an example of the electronic apparatus of the second embodiment is different from that of the first embodiment in terms of the shape of the reinforcing member 33. However, the other elements are the same as those of the first embodiment. Therefore, different elements will be mainly explained, and the same elements will be assigned the same reference symbols, and the explanations thereof will be omitted. The portable computer 11 of the second embodiment has the same appearance as the one shown in FIG. 1.

The reinforcing plate 33 is fixed to the second surface 24B of the printed circuit board 24. The reinforcing plate 33 comprises a first portion 33A corresponding to the first circuit component 25 and a second portion 33B corresponding to the position 35 different from the position of the first circuit component 25. The position 35 different from the position of the first circuit component 25 is a position at which the second circuit component 52 or spacer 54 is located.

In the present embodiment, the reinforcing plate 33 comprises a connecting portion 33C connecting the first portion 33A to the second portion 33B, and the connecting portion 33C integrates the first portion 33A with the second portion 33B.

According to the second embodiment, the portable computer 11 comprises the reinforcing plate 33 fixed to the second surface 24B of the printed circuit board 24, and the reinforcing plate 33 integrally comprises the first portion 33A corresponding to the first circuit component 25 and the second portion 33B corresponding to the position 35 different from the position of the first circuit component 25. When the fixing unit 31 for fixing the heat pipe 27 to the printed circuit board 24 is further provided on the printed circuit board 24, the printed circuit board 24 may be curved toward the heat pipe 27. The above-described structure increases the strength of the printed circuit board 24 and prevents the printed circuit board 24 from being curved, thereby effectively preventing the printed circuit board 24 from being damaged.

Figure 8:
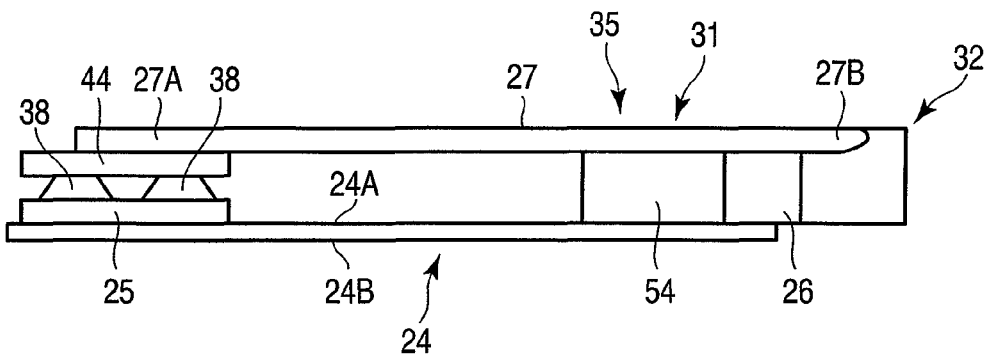
FIG. 8 is an exemplary elevational view schematically showing a printed circuit board, a heat pipe, a fan unit, and a fixing unit of a portable computer which is an example of an electronic apparatus according to a third embodiment.
Figure 9:
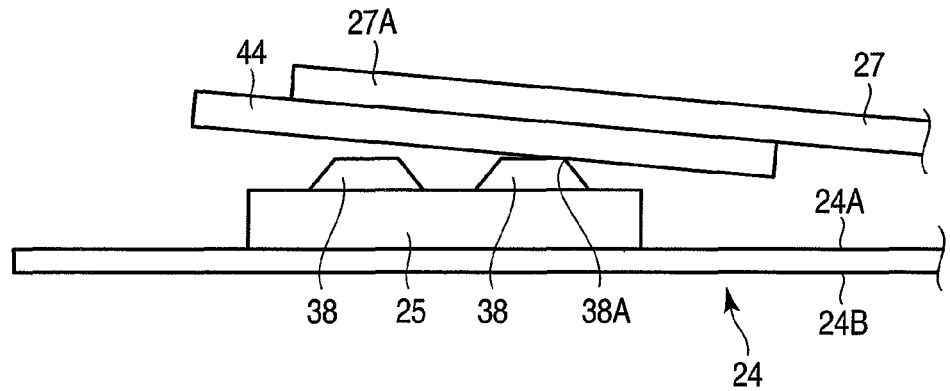
FIG. 9 is an exemplary enlarged elevational view of the printed circuit board, first circuit component and heat pipe shown in FIG. 8.

Referring to FIGS. 8 and 9, a third embodiment of the electronic apparatus will be described. The portable computer 11 which is an example of the electronic apparatus of the third embodiment is different from that of the first embodiment in terms of the shape of the first circuit component 25. However, the other elements are the same as those of the first embodiment. Therefore, different elements will be mainly explained, and the same elements will be assigned the same reference symbols, and the explanations thereof will be omitted. The portable computer of the third embodiment has the same appearance as the one shown in FIG. 1.

FIG. 8 schematically shows the first circuit component 25 on the printed circuit board 24 and a cooling structure for cooling the first circuit component 25. Different from the above-described embodiments, the first circuit component 25 comprises a plurality of dies 38. In the present embodiment, the first circuit component 25 comprises, for example, two dies 38 corresponding to two chips contained in the first circuit component 25. As in the present embodiment, a plurality of dies 38 may be formed in correspondence with the number of chips contained in the circuit component. The first end 27A of the heat pipe 27 is thermally connected to the two dies 38 via the heat receiving plate 44.

Referring to FIG. 9, effectiveness of providing the fixing unit 31 on the printed circuit board 24 as in the present embodiment will be described. FIG. 9 schematically shows a connection structure of the first end 27A of the heat pipe 27 and the heat receiving plate 44 with the dies 38 of the first circuit component 25. When the portable computer 11 is carried by a user, or subjected to vibration or shock, the loads of the heat pipe 27 itself, radiator 32 and fan unit 26 are imposed on the first end 27A of the heat pipe 27, and a large moment is applied to the first end 27A of the heat pipe 27. As schematically shown in FIG. 9, let us assume, for example, the heat pipe 27 is pushed downward at this moment. A large pressure is applied to the die 38 on the right in FIG. 9, and in the worst case, the edge 38A of the die 38 may be damaged. Further, the heat receiving plate 44 is raised from the die 38 on the left in FIG. 9, and the thermal connection between the die 38 on the left and the heat pipe 27 is cut.

However, in the present embodiment, in addition to the part fixing the first end 27A to the first circuit component 25, the fixing unit 31 for fixing the heat pipe 27 to the printed circuit board 24 is provided. Therefore, the load (moment) imposed on the vicinity of the first end 27A of the heat pipe 27 can be shared by the vicinity of the fixing unit 31.

According to the third embodiment, the first circuit component 25 comprises the plurality of dies 38 which are cooled by the heat pipe 27. With this structure, the heat pipe 27 tends to be raised. However, the fixing unit 31 prevents one die 38 from being damaged, and prevents the heat pipe 27 from being raised from the other die 38 to prevent a case where the other die 38 cannot be cooled.

Next, referring to FIG. 10, a fourth embodiment of the electronic apparatus will be described. The portable computer 11 which is an example of the electronic apparatus of the fourth embodiment is different from that of the first embodiment in terms of the position of the fixing unit 31. However, the other elements are the same as those of the first embodiment. Therefore, different elements will be mainly explained, and the same elements will be assigned the same reference symbols, and the explanations thereof will be omitted. The portable computer 11 of the fourth embodiment has the same appearance as the one shown in FIG. 1.

In the present embodiment, a pair of portions of the fixing unit 31 are provided on the inner surface of the housing 21. Namely, the fixing unit 31 comprises a first elastic body 61 provided between the fin unit 32 and the first case 21A and a second elastic body 62 provided between the fin unit 32 and the second case 21B. The first elastic body 61 is adhered to the inner surface of the first case 21A, and a small gap is formed between the first elastic body 61 and the fan unit 32. The second elastic body 62 is adhered to the inner surface of the second case 21B, and a small gap is formed between the second elastic body 62 and the fin unit 32. The first elastic body 61 and second elastic body 62 can fix the heat pipe 27 in a predetermined position at the position 35 different from the position of the first circuit component 25.

The first elastic body 61 and second elastic body 62 are each formed of, for example, elastic sponge, but may be formed of any elastic material, such as rubber. The fixing unit 31 can hold the second end 27B of the heat pipe 27 in a predetermined position. Further, in the present embodiment, the electronic apparatus comprises a bracket 34 which is the same as the bracket 34 shown in FIG. 2, and the bracket 34 fixes the fan unit 26 to the second end 27B of the heat pipe 27.

According to the fourth embodiment, the portable computer 11 comprises the fin unit 32 which is fixed to the second end 27B of the heat pipe 27 and can improve the heat radiation efficiency of the second end 27B, the housing 21 comprises the first case 21A opposed to the first surface 24A of the printed circuit board 24 and the second case 21B opposed to the second surface 24B of the printed circuit board 24, and the fixing unit 31 comprises the first elastic body 61 provided between the fin unit 32 and the first case 21A and the second elastic body 62 provided between the fin unit 32 and the second case 21B.

According to the fourth embodiment, the fin unit 32 can be held in a predetermined position by the first elastic body 61 and the second elastic body 62 with the simple structure. Therefore, the second end 27B of the heat pipe 27 is held in a predetermined position, and vibration of the heat pipe 27 can be suppressed. Consequently, a moment does not act on the vicinity of the first end 27A of the heat pipe 27, and the first circuit component 25 and printed circuit board 24 can be prevented from being damaged. The fixing unit 31 of the present embodiment is advantageous especially in preventing vibration of the heat pipe 27 when there is no space for mounting the fixing unit 31 on the printed circuit board 24.

In addition, the portable computer 11 comprises the bracket 34 for fixing the fan unit 26 to the second end 27B of the heat pipe 27. This structure integrates the fan unit 26 with the second end 27B, thereby imposing the load of the fan unit 26 on the heat pipe 27. However, the fixing unit 31 can effectively prevent the case where the first circuit component 25 and printed circuit board 24 are damaged.

The electronic apparatus is not limited to the portable computer 11 described in the above embodiments, and may be another electronic apparatus such as a mobile telephone set. The electronic apparatus may be variously modified within the spirit of the invention in the stage of implementation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus, comprising:
    a printed circuit board comprising a first surface and a second surface opposite to the first surface, wherein a first circuit component is provided at a first position on the first surface;
    a heat pipe comprising a first end connected to the first circuit component, and a second end opposite to the first end;
    a fan facing the second end of the heat pipe and configured to blow air toward the second end;
    a spacer in place of a second circuit component, the spacer and the second circuit component being each attachable at the same second position different from the first position on the first surface of the printed circuit board, the spacer being equal in height to the second circuit component;
    a fixing unit configured to fix the heat pipe at the second position; and
    a reinforcing plate fixed to the second surface of the printed circuit board, the reinforcing plate corresponding to the first position and the second position.

2. An electronic apparatus, comprising:
    a printed circuit board comprising a first surface and a second surface opposite to the first surface, wherein a first circuit component is provided at a first position on the first surface;
    a heat pipe comprising a first end connected to the first circuit component, and a second end opposite to the first end;
    a fan facing the second end of the heat pipe and configured to blow air toward the second end;
    one of a second circuit component and a spacer, each attachable at the same second position different from the first position on the first surface of the printed circuit board;
    a fixing unit configured to fix the heat pipe at the second position; and
    a bracket configured to fix the fan to the second end of the heat pipe.

3. The electronic apparatus of claim 1, wherein the reinforcing plate integrally comprising a first portion corresponding to the first circuit component and a second portion corresponding to the second position.

4. The electronic apparatus of claim 1, wherein the spacer comprises a rubber material.

5. The electronic apparatus of claim 1, wherein the spacer comprises a plastic material.

6. The electronic apparatus of claim 1,
    wherein the spacer comprises the same shape as the second circuit component.

7. The electronic apparatus of claim 1,
    wherein the spacer is fixed to the printed circuit board by the fixing unit.

8. The electronic apparatus of claim 1, wherein the spacer is located in a vicinity of the fan.

9. An electronic apparatus comprising:
a printed circuit board comprising a first surface and a second surface opposite to the first surface, wherein a first circuit component is provided at a first position on the first surface;
a heat pipe comprising a first end connected to the first circuit component, and a second end opposite to the first end;
a fan facing the second end of the heat pipe and configured to blow air toward the second end;
one of a second circuit component and a spacer, each attachable at the same second position different from the first position on the first surface of the printed circuit board;
a fixing unit configured to fix the heat pipe at a the second position;
a reinforcing plate fixed to the second surface of the printed circuit board, the reinforcing plate corresponding to the first position and the second position;
a housing comprising a first case opposed to the first surface of the printed circuit board and a second case opposed to the second surface of the printed circuit board; and
a fin unit fixed to the second end of the heat pipe,
wherein the fixing unit comprises a first elastic body between the fin unit and the first case, and a second elastic body between the fin unit and the second case.

10. The electronic apparatus of claim 1, wherein the fixing unit is located closer to the fan than the first circuit component and configured to restrict displacement of the heat pipe in a thickness direction of the printed circuit board.

11. An electronic apparatus, comprising:
a printed circuit board comprising a first surface and a second surface opposite to the first surface, wherein a first circuit component is provided at a first position on the first surface;
a heat pipe comprising a first end connected to the first circuit component, and a second end opposite to the first end;
a fan facing the second end of the heat pipe and configured to blow air toward the second end;
one of a second circuit component and a spacer, each attachable at the same second position different from the first position on the first surface of the printed circuit board;
a fixing unit configured to fix the heat pipe at a the second position;
a reinforcing plate fixed to the second surface of the printed circuit board, the reinforcing plate corresponding to the first position and the second position; and
a bracket configured to fix the fan to the second end of the heat pipe,
wherein:
the second circuit component is provided,
the reinforcing plate is provided to correspond to the first circuit component and the second circuit component, and
the fixing unit positions the heat pipe with respect to the printed circuit board by pushing the heat pipe toward the second circuit component.

12. The electronic apparatus of claim 11, wherein the reinforcing plate comprises a first portion corresponding to the first circuit component and a second portion corresponding to the second circuit component.

13. The electronic apparatus of claim 2, wherein the fixing unit is located closer to the fan than the first circuit component and configured to restrict displacement of the heat pipe in a thickness direction of the printed circuit board.

14. The electronic apparatus of claim 6, wherein the fixing unit is located closer to the fan than the first circuit component and configured to restrict displacement of the heat pipe in a thickness direction of the printed circuit board.

15. The electronic apparatus of claim 7, wherein the fixing unit is located closer to the fan than the first circuit component and configured to restrict displacement of the heat pipe in a thickness direction of the printed circuit board.

16. The electronic apparatus of claim 8, wherein the fixing unit is located closer to the fan than the first circuit component and configured to restrict displacement of the heat pipe in a thickness direction of the printed circuit board.

* * * * *